March 17, 1964 W. F. ALTENPOHL 3,124,833
POULTRY SHACKLE FOR OVERHEAD CONVEYOR AND CARRIAGE ASSEMBLY
Filed July 9, 1962
2 Sheets-Sheet 1

William F. Altenpohl
INVENTOR.

BY *Clarence A. O'Brien*
*and Harvey B. Jacobson*
Attorneys

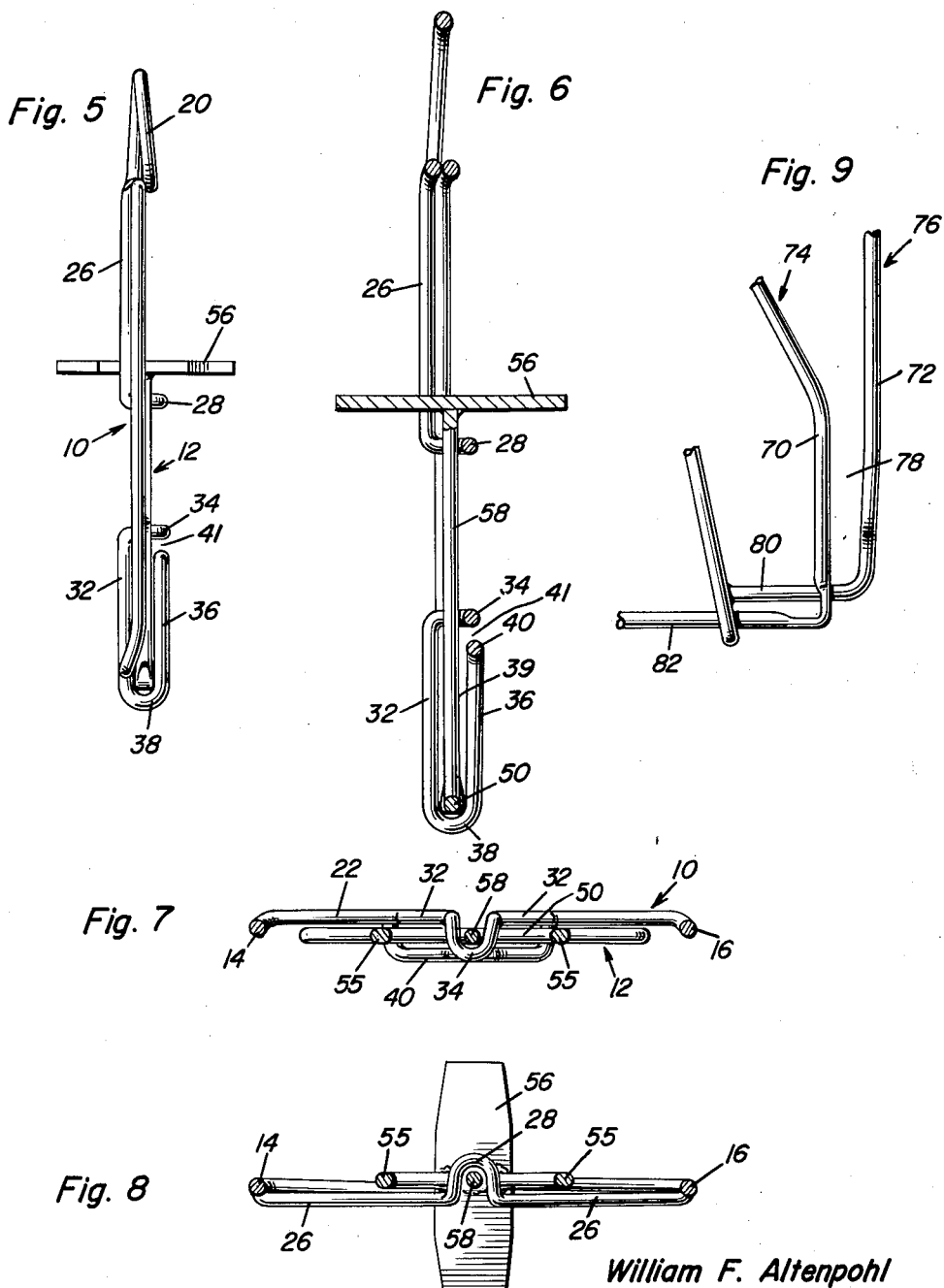

United States Patent Office 3,124,833
Patented Mar. 17, 1964

3,124,833
POULTRY SHACKLE FOR OVERHEAD CONVEYOR
AND CARRIAGE ASSEMBLY
William F. Altenpohl, Philadelphia, Pa.
(Union Hill Industries Park, West Conshohocken, Pa.)
Filed July 9, 1962, Ser. No. 208,399
16 Claims. (Cl. 17—44.1)

This invention comprises a novel and useful poultry shackle for an overhead conveyor and carriage assembly and more particularly pertains to a shackle particularly adapted for the supporting of poultry and the like during the processes of killing, dressing and eviscerating poultry.

The shackle set forth and claimed hereinafter is similar in subject matter to the poultry shackles disclosed in my prior copending application Serial No. 137,815, filed September 13, 1961, for Poultry Shackle for overhead Conveyor and Carriage Assembly and constitutes an improvement thereover.

The primary object of this invention is to provide a poultry shackle specifically adapted for securely supporting and carrying poultry in a dependent position therefrom and which shackle is especially designed for use with a poultry overhead conveyor system, and has as its primary purpose the provision of a shackle of extremely light weight, of simple and inexpensive construction, one which is highly efficient in use, durable and easy to sterilize and clean.

A further object of the invention is to provide a shackle consisting of two relatively movable components one of which comprises a support by which the shackle and the fowl carried thereby is dependingly mounted from an overhead conveyor system and a holder slidably and guidably mounted upon the support for selectively securing or releasing poultry from the shackle.

Yet another object of the invention is to provide a poultry shackle in conformance with the preceding objects in which the holder is provided with an actuator well-adapted for either manual operation to release the poultry from the shackle or automatic operation for the same purpose.

A still further and more specific object of the invention is to provide a poultry shackle in accordance with the preceding objects in which the two components thereof shall be of a rod-like construction with a substantial elimination of sharp corners, projections, curves or contours in order to render the cleansing and sterilizing of the device easier and more efficient.

And a final and important object of the invention to be specifically enumerated herein resides the provision of a poultry shackle in compliance with the objects set forth above in which a vertically movable holder provides with its support member a plurality of pockets for receiving the extremities of poultry therein and whereby in the lowered position of the holder the pockets are closed for retaining the poultry extremities but in the upper position of the holder the pockets are opened at their bottom to permit easy release of the poultry extremities therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a side elevational view of the shackle as viewed from the left side of FIGURE 1;

FIGURE 6 is a view in vertical longitudinal section through the shackle of FIGURE 1, being taken substantially upon the plane indicated by the section line 6—6 of FIGURE 1;

Figure 1:
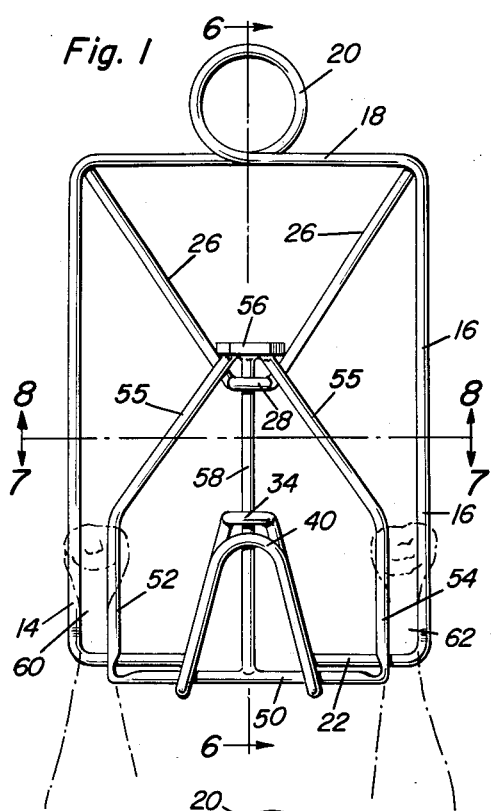
FIGURE 1 is an elevational view from the front side of the poultry shackle in accordance with his invention and showing in dotted lines the manner in which the legs of poultry are retained in the shackles.

FIGURES 7 and 8 are horizontal sectional detailed views taken substantailly upon the planes indicated by section line 7—7 and 8—8 respectively of FIGURE 1; and FIGURE 9 is a detailed view of the lower right hand portion of the shackle of FIGURE 1 but showing a slightly modified construction thereof.

A preferred embodiment of a poultry shackle in accordance with this invention is illustrated in the accompanying drawings and consists of two relatively movable components comprising a support indicated generally by the numeral 10 and with which is associated a holder indicated generally by the numeral 12. Each of these components is embodied in a frame of a rod-like material.

Referring first to the support component 10, it will be observed that this member has the configuration of a generally rectangular frame including a pair of generally parallel sides 14 and 16 which are joined at their upper ends by a top member or wall 18 formed with a supporting loop or bail 20 at the midportion thereof. This loop constitutes a means by which the shackle may be suspended from a hook or other suitable support carried by the conventional overhead poultry conveyor, not shown, but which conveyor may be of any suitable type such as that indicated generally in my above identified copending application.

At its lower end, the support 10 includes a transversely extending bottom member or wall 22. As so far described, the frame of the support 10 is of one-piece rod-like construction with all of its corners being rounded in order to facilitate cleaning and sterilizing of the support after its use.

The top and bottom walls 18 and 22 of the support are provided with a retaining means by which the holder 12 is mounted upon and is slidingly guided for relative vertical movement upon the support. Thus, an upper guide and retaining means indicated generally by the numeral 24 is provided consisting of a pair of angulated legs 26 each of which has its upper ends secured to the top wall 18 at the junction of the latter with the side members 14 and 16, the legs being downwardly convergent toward each other and being joined at the lower ends by a laterally and horizontally extending U-shaped loop 28 which lies laterally to one side of the plane of the rectangular frame of the support 10. In a similar manner, a lower guide and retaining means indicated generally by the numeral 30 is carried by the bottom wall 22. For this purpose, a pair of upwardly convergent inclined legs 32 are secured to and interposed between the two opposite ends of the bottom wall 22 to project upwardly into the hollow interior of the frame. At their upper ends, these legs 32 are provided with a laterally projecting U-shaped loop 34 which may be identical with the loop 28 of the upper guide means and is vertically aligned therewith. The lower divergent ends of the legs 32 are joined by an upwardly extending pair of inclined arms 36 integrally joined to the lower ends of the legs 32 as by the U-shaped loop portions 38 and to each other at their upper ends as by the curved portion 40. The members 36 are disposed in parallel relation to the members 32 so as to provide a U-shaped pocket 39 therebetween and there is a slight clearance 41 provided between the loop 34 and the curved portion 40.

When viewed in side elevation or in top plan as in FIGURES 5-8, it will be observed that the loops 28, 34, 40 and 38 are all laterally displaced from the vertical plane through the rectangular support 10.

Figure 4:
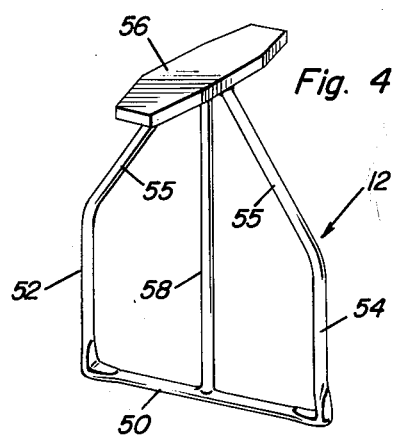
FIGURE 4 is a perspective view of the holder component of the shackle.

Referring now particularly to FIGURE 4, it will be observed that the holder 12 likewise consists of a rod-like open frame including a horizontally extending bottom wall or member 50 having upwardly extending side walls 52 and 54 at its opposite ends. These side walls terminate in upwardly and inwardly convergent portions 55 which are fixedly connected at their upper ends to an actuator 56 which may conveniently be in the form of a transversely extending bar or plate. A medially disposed rod 58 comprising a guide stem for the holder is united at its upper and lower ends to the underside of the plate 56 between the side member portions 52, 54 and the midportion of the bottom member 50.

The dimensions and proportions of the holder are such with respect to those of the support 10 that the holder may be slidably connected to or mounted upon the support. The width of the holder, that is, the length of the cross bottom member 50 is less than the width of the support, as will be apparent from FIGURES 1 and 2, and the vertical height of the holder is likewise less. The arrangement is such that the holder may be received in the support 10 between the side members 14 and 16 thereof so that the bottom wall 50 may be then retained in the pocket 39 between the members 34 and 40 of the support. Thereupon, the cross member 50 may move vertically in the pocket 39 formed between the members 36 and 32 of the holder while the stem 58 is slidable through the guiding loops 28 and 34. When so applied, the holder may be moved vertically with respect to the support as will be seen from a comparison of FIGURES 1 and 2, between a lowered position shown in FIGURE 1 and a raised position shown in FIGURE 2.

Figure 2:
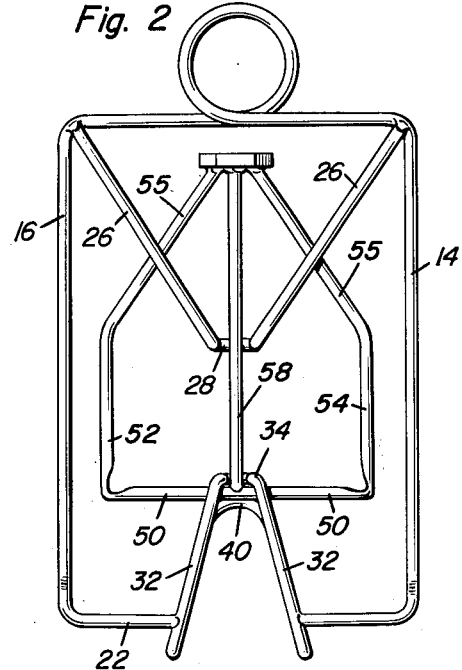
FIGURE 2 is an elevational view from the reverse side of FIGURE 1 but showing the holder in its raised position for releasing poultry from the shackle.
Figure 3:
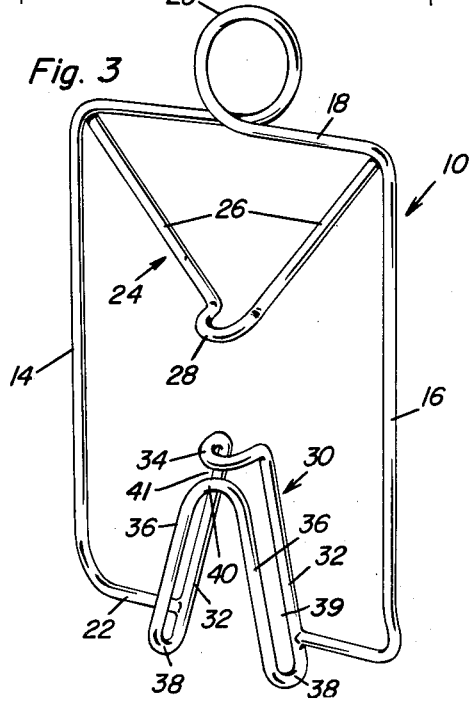
FIGURE 3 is a perspective view of the support component of the shackle.

In its lowered position, as shown in FIGURE 1, the cross bar 50 of the holder will be disposed below the bottom member 22 of the support while in the raised position as shown in FIGURE 2, this lower member 50 will be raised above the bottom member.

In a preferred form of the invention the side members 52 and 54 of the holder are disposed in a substantially parallel relation to the side members 14 and 16 respectively of the support to thus provide pockets 60 and 62 therebetween into which may be received the extremities such as the neck or legs of a fowl as indicated in dotted lines in FIGURE 1. The inclined portions 55 of the holder provide guiding surface which facilitate the downward movement of the poultry extremities into the pockets 60 and 62 where there will be gravity retained therein.

In the lower position of the holder, it will be observed that the support bottom member 22 constitutes a closure or bottom wall for the pocket thereby retaining the fowl extremities therein. However, when the holder is raised as shown in FIGURE 2, either manually or by some other means, the bottom wall 22 of the support will be spaced from the bottom member 50 of the holder to such an extent that the extremities of the fowl may readily pass downwardly to the open bottom end of the pocket and thus be released from the shackle.

From the consideration of FIGURES 1 and 2, and the specific structure of the support and holder components, it will be noted that an effective guiding and retaining action is provided for the relatively vertically slidable movement of these components. Thus, the loops 28 and 34 of the guide means operate to prevent outward movement of the stem 58 of the holder in one direction, while the overlapping sliding engagement of the portions 55 on the members 26 and of the side members 52 and 54 within the pocket 39 defined by the members 32 and 36 effects a secure guiding and retaining action upon the holder throughout all ranges of its vertical travel.

In the preceding form of the invention it has been stated that the pockets 60 and 62 have substantially parallel side walls formed by the opposed pairs of surfaces of the members 14, 52 and 54, 16. In some instances, however, it is preferred to provide a slight taper to these opposed surfaces of the side members. Thus, shown in FIGURE 9, one or both of the side members 70 and 72 of the holder 74 and the support 76 may be relatively inclined so as to provide a wedge shaped pocket 78 therebetween. The bottom member constructions 80 and 82 of the support and holder components may be identical in this form of the invention with the constructions 22 and 50, previously described.

The operation of this form of the invention is the same except for the slight wedging action produced by the wedge-shaped pockets 78.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A poultry shackle for a poultry conveyor system of the overhead type comprising a support and a holder, a means slidably and guidingly mounting and retaining said holder on said support for relative vertical movement, pairs of cooperating opposed vertical surfaces in side-by-side relation on said support and holder defining vertical pockets between said surfaces of a substantially uniform width sufficient for receiving and retaining by gravity the extremity of a fowl when placed therein, said support having a bottom wall toward and from which said holder is movable, said bottom wall in the lower position of said holder cooperating with and engaging said opposed surfaces and defining a bottom closure for said pockets and in the holder upper position being out of engagement with said holder surfaces and affording an outlet opening for said pockets of greater width than that of said pockets.

2. A poultry shackle for a poultry conveyor system of the overhead type comprising a support and a holder, a means slidably and guidingly mounting and retaining said holder on said support for relative vertical movement, pairs of cooperating opposed surfaces in side-by-side relation on said support and holder defining vertical pockets for receiving and retaining by gravity the extremity of a fowl, when placed therein, said support having a bottom wall toward and from which said holder is movable, said bottom wall in the lower position of said holder defining a bottom for said pockets and in the upper position affording an outlet opening for said pockets, support means on said support and an actuator on said holder, said support including U-shaped laterally projecting vertically aligned loops offset from the plane of the support, said holder having a stem slidably received in said loops.

3. A poultry shackle for a poultry conveyor system of the overhead type comprising a support and a holder, a means slidably and guidingly mounting and retaining said holder on said support for relative vertical movement, pairs of cooperating opposed surfaces in side-by-side relation on said support and holder defining vertical pockets for receiving and retaining by gravity the extremity of a fowl, when placed therein, said support having a bottom wall toward and from which said holder is movable, said bottom wall in the lower position of said holder defining a bottom for said pockets and in the upper position affording an outlet opening for said pockets, support means on said support and an actuator on said holder, said support including a U-shaped vertically extending pocket with a bottom wall, said holder having a horizontal cross member movable vertically and guidably received and retained in said pocket.

4. The combination of claim 1 wherein said opposed surfaces are parallel.

5. The combination of claim 1 wherein said opposed surfaces are upwardly divergent.

6. A poultry shackle for a poultry conveyor system of the overhead type comprising a support and a holder, a means slidably and guidingly mounting and retaining said holder on said support for relative vertical movement, pairs of cooperating opposed surfaces in side-by-side relation on said support and holder defining vertical pockets for receiving and retaining by gravity the extremity of a fowl, when placed therein, said support having a bottom wall toward and from which said holder is movable, said bottom wall in the lower position of said holder defining a bottom for said pockets and in the upper position affording an outlet opening for said pockets, support means on said support and an actuator on said holder, said support including U-shaped laterally projecting vertically aligned loops offset from the plane of the support, said holder having a stem slidably received in said loops, said U-shaped loops projecting towards each other and being carried by the top and bottom members of said support.

7. A poultry shackle for a poultry conveyor system of the overhead type comprising a support and a holder, a means slidably and guidingly mounting and retaining said holder on said support for relative vertical movement, pairs of cooperating opposed surfaces in side-by-side relation on said support and holder defining vertical pockets for receiving and retaining by gravity the extremity of a fowl, when placed therein, said support having a bottom wall toward and from which said holder is movable, said bottom wall in the lower position of said holder defining a bottom for said pockets and in the upper position affording an outlet opening for said pockets, support means on said support and an actuator on said holder, said holder and support each having a horizontal bottom wall and said holder has a vertical stem, said support bottom wall having a retaining guide assembly mounted thereon, said assembly including a pair of upwardly convergent arms on said support bottom wall and a U-shaped laterally projecting loop joining the upper ends of said arms, a pair of laterally offset upwardly convergent legs each parallel to and spaced from one of said arms, said legs being joined at their upper end by a curved portion disposed in spaced relation below said U-shaped loop, the lower ends of said legs being each joined with the lower ends of an arm whereby to provide a vertically extending pocket between said arms and legs, said holder bottom wall being vertically slidable and retained in said last-mentioned pocket and said stem being received in said U-shaped loop.

8. A poultry shackle for an overhead poultry conveyor comprising a support and a holder, a means slidably and guidingly mounting and retaining said holder on said support for relative vertical movement, said guide means comprising upper and lower guide members mounted upon said support and projecting laterally to one side of the latter, said holder having a stem slidably engaged in said guide members, pairs of cooperating opposed surfaces in side-by-side relation on said support and holder defining vertical pockets for receiving and retaining by gravity the extremity of a fowl when placed therein, said support having a bottom wall toward and from which said holder is movable, said bottom wall in the holder lower position defining a bottom closure for said pockets and in the holder upper position affording an outlet opening for said pockets.

9. An overhead conveyor poultry shackle comprising support and holder components, said support component including transverse upper and lower cross-members, guide means retaining said components for guided vertical sliding movement upon each other, a pair of vertical surfaces disposed one on each component and laterally spaced to provide therebetween a pocket of sufficient width to receive therein and retain the extremity of a fowl, said support lower cross-member cooperating with said vertical surfaces and constituting a removable bottom closure for said pocket, the lower portion of the vertical surface of the holder in the raised position of the latter being lifted above said lower cross-member thereby providing a laterally enlarged outlet opening for said pocket and in the holder lowered position extending beneath said lower cross-member thereby closing said pocket, said guide means including a guide element carried by one component and being disposed inwardly of and between said cross-members, the other of said components having a guide member slidably received in said guide element.

10. The combination of claim 9 wherein said holder has a bottom wall which is movable vertically alongside of the support and from positions disposed below and above said support lower cross-member.

11. The combination of claim 9 wherein said guide element is carried by and depends from said support upper cross-member.

12. The combination of claim 11 wherein said guide means further includes a lower guide element carried by and projecting upwardly from said support lower cross-member and guidingly engaging said holder.

13. The combination of claim 9 including an actuator secured to the upper portion of said holder and projecting laterally therefrom, said actuator being confined to vertical movement between said upper and lower cross-members.

14. The combination of claim 9 wherein said holder is solely gravity biased to its lowered position.

15. The combination of claim 9 wherein said guide element comprises a pair of laterally spaced upstanding members carried by and projecting upwardly from said support lower cross-member towards said upper cross-member and forming a guide space opening at the upper ends of said upstanding members, said holder having a guide portion at its lower end reciprocatingly and guidingly received in said guide space.

16. The combination of claim 9 wherein said guide means comprises said guide element carried by said upper cross-member and a second guide element comprising a pair of laterally spaced upstanding members carried by and projecting upwardly from said support lower cross-member towards said upper cross-member and forming a guide space opening at the upper ends of said upstanding member, said holder having a guide portion at its lower end reciprocatingly and guidingly received in said guide space.

References Cited in the file of this patent

UNITED STATES PATENTS 2,990,573    Pitts et al.               July 4, 1961

FOREIGN PATENTS 136,525    Russia                  Mar. 14, 1961